(12) United States Patent
Rigby et al.

(10) Patent No.: US 7,124,036 B2
(45) Date of Patent: Oct. 17, 2006

(54) METHOD AND SYSTEM FOR DETERMINING DEMAND IN A WATER DISTRIBUTION SYSTEM

(75) Inventors: Gene Rigby, Marion, OH (US); Amy Lee Rigby, Marion, OH (US)

(73) Assignee: Underground Utility Services, Inc., Marion, OH (US)

( * ) Notice: Subject to any disclaimer, the term of this patent is extended or adjusted under 35 U.S.C. 154(b) by 0 days.

(21) Appl. No.: 11/159,933

(22) Filed: Jun. 23, 2005

(65) Prior Publication Data

US 2006/0015269 A1    Jan. 19, 2006

Related U.S. Application Data

(60) Provisional application No. 60/583,114, filed on Jun. 25, 2004.

(51) Int. Cl.
   *G01F 1/00*       (2006.01)
   *G01F 7/00*       (2006.01)
(52) U.S. Cl. .................................................... 702/45
(58) Field of Classification Search ................ 702/12, 702/45, 50, 55, 100; 700/282–285; 73/861
   See application file for complete search history.

(56) References Cited

U.S. PATENT DOCUMENTS

| | | |
|---|---|---|
| 3,841,146 A | 10/1974 | Cross et al. |
| RE29,868 E | 12/1978 | Schontzler et al. |
| 4,827,762 A | 5/1989 | Hasselman |
| 4,835,522 A | 5/1989 | Andrejasich et al. |
| 4,954,973 A | 9/1990 | Jacob et al. |
| 5,075,877 A | 12/1991 | Jacob et al. |
| 5,075,878 A | 12/1991 | Ohtomo et al. |
| 5,245,634 A | 9/1993 | Averbuch |
| 5,297,423 A | 3/1994 | Keating et al. |
| 5,423,457 A | 6/1995 | Nicholas et al. |
| 5,471,867 A | 12/1995 | Tuma et al. |
| 5,544,518 A | 8/1996 | Hart et al. |

(Continued)

FOREIGN PATENT DOCUMENTS

WO    WO 02/077580 A1    10/2002

(Continued)

OTHER PUBLICATIONS

Internet Website (http://www.rickly.com/sm/Float-Type/ShaftEncoders/ShaftEncoders.htm) Visited: Apr. 21, 2004. Entitled: "Shaft Encoders & Systems".

*Primary Examiner*—Michael Nghiem
(74) *Attorney, Agent, or Firm*—James R. Eley; Michael A. Forhan; Eley Law Firm Co.

(57) ABSTRACT

Demand in a water distribution system is determined by the steps of measuring the volume of water flowing into the water distribution system through an input during a predetermined interval of time, measuring the change in the volume of water stored in the storage reservoir during the same time interval, measuring the volume of water flow exiting the water distribution system through an output during the same time interval, calculating an adjusted input measurement by subtracting the measured flow of water exiting the water distribution system from the measured volume of water flow into the water distribution system, and adding a measured increase in the volume of the water in the storage reservoir to the adjusted input measurement or subtracting a measured decrease in the volume of water in the storage reservoir from the adjusted input measurement to determine the demand.

23 Claims, 3 Drawing Sheets

U.S. PATENT DOCUMENTS

| | | |
|---|---|---|
| 5,665,895 A | 9/1997 | Hart et al. |
| 5,757,664 A | 5/1998 | Rogers et al. |
| 5,807,245 A | 9/1998 | Aldestam et al. |
| 5,812,421 A | 9/1998 | Fujii et al. |
| 6,185,483 B1 | 2/2001 | Drees |
| 6,272,672 B1 | 8/2001 | Conway |
| 6,377,190 B1 | 4/2002 | Saar |
| 6,401,045 B1 | 6/2002 | Rogers et al. |
| 6,411,909 B1 | 6/2002 | Charrier et al. |
| 6,430,514 B1 | 8/2002 | Saar et al. |
| 6,526,358 B1 | 2/2003 | Mathews, Jr. et al. |
| 6,685,054 B1 | 2/2004 | Kameyama |
| 6,981,754 B1 * | 1/2006 | Godil et al. .................. 347/17 |
| 2001/0026225 A1 * | 10/2001 | Young ........................ 340/606 |
| 2002/0101373 A1 * | 8/2002 | Arndt et al. ................. 342/124 |
| 2002/0103608 A1 | 8/2002 | Olson et al. |
| 2003/0183163 A1 * | 10/2003 | Kubo et al. ................. 117/213 |

FOREIGN PATENT DOCUMENTS

WO    WO 02/077581 A1    10/2002

* cited by examiner

METHOD AND SYSTEM FOR DETERMINING DEMAND IN A WATER DISTRIBUTION SYSTEM

This application claims priority to U.S. provisional application 60/583,114, filed Jun. 25, 2004, the contents of which are hereby incorporated by reference.

FIELD

The present invention relates generally to a method and system for determining the amount of demand in a water distribution system, particularly to a method and system for quantifying the magnitude of leaks in a municipal water system and the effect that repairs to leaks has on the overall loss.

BACKGROUND

Water distribution systems typically include a network of pipes, one or more metered incoming sources of water, storage tanks and a plurality of consumers. Current practice in measuring water consumption or demand is to meter the amount of water supplied to the input of the water distribution system on a daily basis. However, this measurement does not account for the volume of water either stored or removed from storage on a daily basis. Accordingly, current measurement practices cannot derive the incremental amount of water actually being consumed and/or lost during short periods of time. Typically, water distribution system operators derive a rough measure of system demand by reading the consumers' water meters over a given period of time, summing the measurements, and then comparing that amount to the metered amount of water input into the distribution system over the same period of time. These two amounts are then compared to determine the amount of unaccounted-for water, deemed to be system losses. A drawback of this method of measurement is that not all of the consumption meters are read at the same time as the incoming water meter. Further, the consumption meter readings are normally spread out over a longer period of time. To compensate for this, operators usually use a running average of consumption (accumulated consumers' metered amounts) versus the incoming water to derive unaccounted for water losses. This is both an impractical and extremely inaccurate method for determining losses. There remains a need for a way to more accurately assess the amount of demand and/or loss in a water distribution system.

A particular problem for operators of water distribution systems, such as municipalities, is unaccounted-for water losses due to leakage in the system. Leaks cause wastage of water, which is often a scarce and expensive commodity. Leaks are also an economic burden to the operators, as they must pay the expenses of obtaining and treating the water that is ultimately lost and not consumed by a paying subscriber. Accordingly, there is a need for a way to efficiently detect leaks in a water distribution system.

SUMMARY

A method according to an embodiment of the present invention utilizes a combination of water inlet meters, water output meters and, where applicable, meters to measure changes in the volume of water stored in storage reservoirs. The measured volumes are used as variables in an equation to determine the amount of demand upon a given water distribution system to accurately compute the actual volume of both accounted-for and unaccounted-for water consumed by the distribution system over selectable increments of time. Since water entering the water distribution system does not undergo significant compression, every gallon of water entering the system displaces another gallon already in the system which is being consumed in either an accounted-for or unaccounted-for manner as stored water, water consumed by subscribers, and/or water metered into another distribution system. When water demand of the distribution system exceeds the amount being supplied by incoming metered sources, supplemental water may be drawn from one or more storage systems located within the water distribution system. These can comprise one or more storage reservoirs such as elevated storage tanks or above-ground storage tanks which pump or gravity feed water into the system, thus maintaining system water pressure.

An aspect of the present invention is a method for determining the amount of demand in a water distribution system having an input, a storage reservoir and an output. The method comprises the steps of measuring the volume of water flowing into the water distribution system through the input during a predetermined interval of time, measuring the change in the volume of water stored in the storage reservoir during the same time interval, and measuring the volume of water flow exiting the water distribution system through the output during the same time interval. Next, an adjusted input measurement is calculated by subtracting the measured flow of water exiting the water distribution system from the measured volume of water flow into the water distribution system, and then either adding a measured increase in the volume of the water in the storage reservoir to the adjusted input measurement, or subtracting a measured decrease in the volume of water in the storage reservoir from the adjusted input measurement, to determine the amount of demand upon the water distribution system.

Another aspect of the present invention is a system for determining the amount of demand in a water distribution system having an input, a storage reservoir and an output. The system comprises a first flow meter to measure the flow of water through the input. A first time source provides time data corresponding to measurements of the first flow meter. A first data storage location records the measurements of the first flow meter and time data corresponding to measurements of the first flow meter. A second flow meter measures the flow of water through the output. A second time source is synchronized with the first time source and is configured to provide time data corresponding to measurements of the second flow meter. A second data storage location records the measurements of the second flow meter and time data corresponding to measurements of the second flow meter. A water level meter measures the volume of water stored in the storage reservoir. A third time source is synchronized with the first time source and is configured to provide time data corresponding to the measurements of the water level meter. A third data storage location records the measurements of the water level meter and time data corresponding to measurements of the water level meter. Lastly, a control portion is configured to receive measurements and corresponding time data from the first, second and third data storage locations and calculate the demand upon the water distribution system.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like numerals will be used to describe features of the invention having similar structures and/or functions. A method according to at least one embodiment of the invention measures water consumption due to accounted-for water demand (i.e., metered consumption by subscribers to the distribution system) and unaccounted-for water demand (i.e., leaks) in either very small increments of time or in real-time in a water distribution system.

Figure 1:
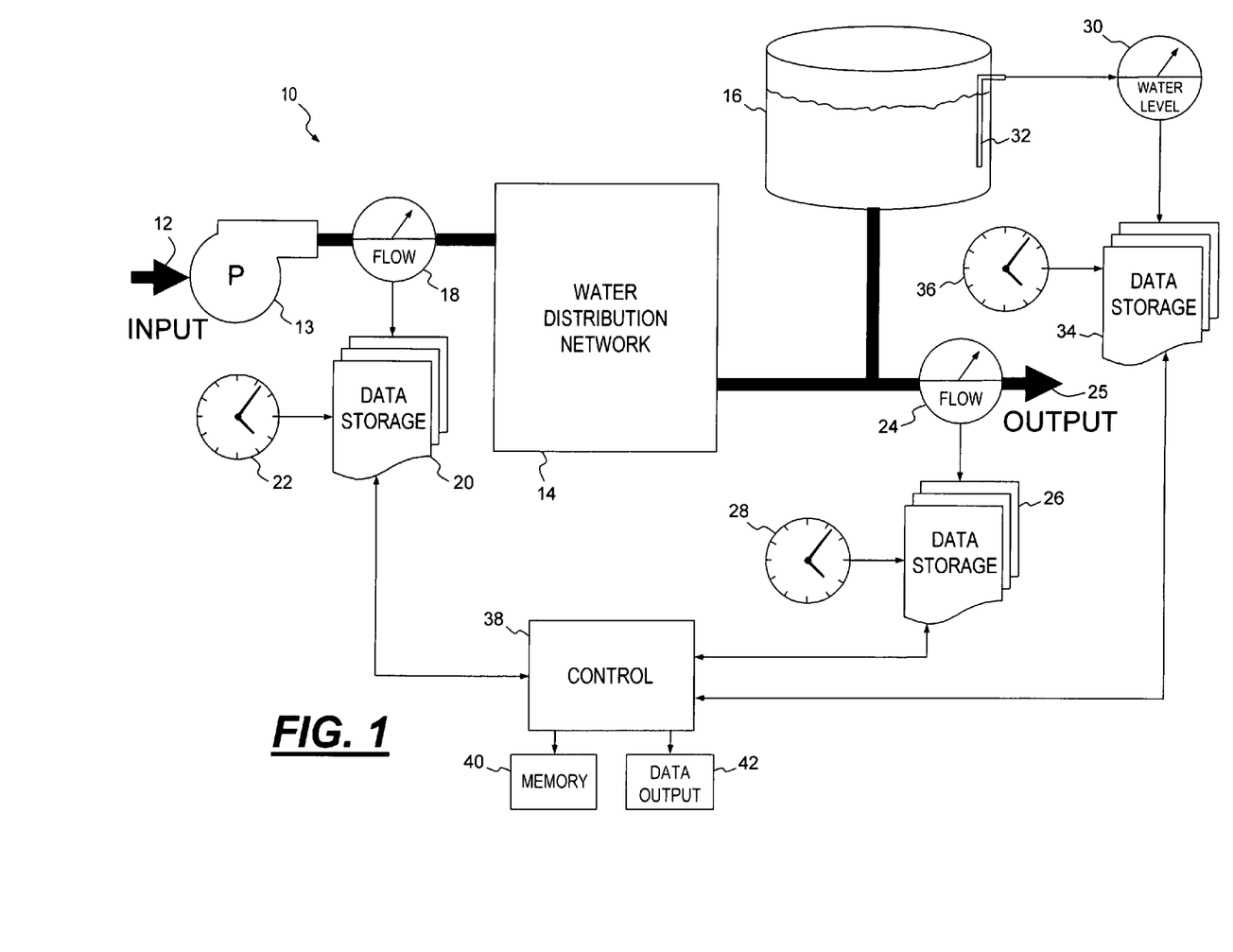
FIG. 1 is a schematic view of a method and system for assessing the amount of water demand in a water distribution system having a water storage facility, according to an embodiment of the present invention.

With reference to FIG. 1, a typical water distribution system 10 comprises one or more inputs 12 which may include a pump 13 as shown, or may be gravity-fed. Water flows through a first flow meter 18 and then into a water distribution network 14, which typically includes a network of pipes to deliver the water to consumers. Consumers obtain the water via one or more outputs 25 of distribution network 14, such as taps. Distribution network 14 may further comprise one or more storage reservoirs 16, such as a water tank.

With continued reference to FIG. 1, water distribution system 10 is configured for measurement of demand in accordance with an embodiment of the present invention. First flow meter 18 periodically and/or continuously measures the rate of water flow to distribution system 10 from input 12 and stores the input flow data in a first data storage location 20. Data storage location 20 additionally receives and stores a corresponding time stamp for each input flow measurement, provided by a first time source 22. A second flow meter 24 measures water flow exiting an output 25 from distribution system 10 and stores the output flow data in a second data storage location 26. Data storage location 26 additionally receives and stores a corresponding time stamp for each output flow measurement, provided by a second time source 28 that is synchronized with first time source 22. A water level meter 30 receives data from a transducer 32 corresponding to the water level of storage reservoir 16 stores the water level data in a third data storage location 34. Data storage location 34 additionally receives and stores a corresponding time stamp for each water level measurement, provided by a third time source 36 that is synchronized (not shown) with first and second time sources 22, 28. Although only one output 25 is shown in FIG. 1, each output branch of the water distribution system 10 may be equipped with one or more flow meters, data storage locations and synchronized time sources. Likewise, a plurality of storage reservoirs may be employed in a water distribution system and equipped with water level meters, storage locations and synchronized time sources.

A control 38 is configured to receive and store measurement data and time stamps corresponding to the data from data storage locations 20, 26 and 34. Control 38 converts the water level measurement data for storage reservoir 16 to a corresponding water flow value by known methods, such as a lookup table calibrated for a predetermined level to volume relationship data table developed for a particular physical configuration (i.e., size and shape) storage reservoir 16. Likewise, a flow equation or algorithm may be derived that quantifies water flow measurement values corresponding to changes in the water level of a particular storage reservoir 16.

Once flow data and corresponding time stamps are available for input 12, storage reservoir 16 and output 25, control 38 is able to compute the demand upon water distribution system 10 for any discrete period of time wherein data for the selected period of time is stored in data storage locations 20, 26, 34. Demand may be computed utilizing Equation 1, below:

$$D_T = V_T \pm \Delta S_T \quad \text{Equation 1}$$

where $D_T$ is the water demand during a time interval (T), $V_T$ is the volume of water provided to water distribution system 10 by input 12 during the same time interval (T) and $\Delta S_T$ is the change in the stored volume of storage reservoir 16 and/or water exiting the water distribution system via output 25 during same time interval (T).

Computed demand data for one or more time intervals may be stored in any of a memory 40 and data storage locations 20, 26, 34. Computed demand data may also be provided to a data output 42 for display and/or control purposes, discussed in greater detail below.

Flow meters 18, 24 may be any conventional type of water flow measurement device including, without limitation, differential pressure flow meters, velocity flow meters, positive displacement flow meters, mass flow meters and open channel flow meters. Flow meters 18, 24 preferably provide an output signal that corresponds to the flow measurement and is compatible with data storage locations 20, 26. The output signal may be in the form of any type of wired or wireless, electrical or optical, analog or digital signal, including serial and parallel data bus signals. A flow meter having a high degree of measurement accuracy and resolution is preferred, as the accuracy of the computed water distribution system demand generally corresponds to the accuracy of the measured flow.

Water level meter 30 may be any type of conventional water level measurement device configured to produce data corresponding to a signal from transducer 32, the combination of the water level meter and the transducer serving to measure the water level in storage reservoir 16. Water level meter 30 provides an output signal that corresponds to the water level measurement and is compatible with data storage location 34. A water level meter having a high degree of measurement accuracy and resolution is preferred, as the accuracy of the computed water distribution system demand generally corresponds to the accuracy of the measured water level.

Transducer 32 may be any type of transducer capable of providing an electrical signal corresponding the level of water in storage reservoir 16. Types of transducers 32 include, without limitation, float-type transducers, pressure transducers and incremental- and absolute-position optical encoders. A transducer having a high degree of measurement accuracy and resolution is preferred, as the accuracy of the computed water distribution system demand generally corresponds to the accuracy of the measured water level. Transducer 32 may be co-located with water level meter 30, or may be remotely linked to the water level meter by any conventional wired or wireless means.

The time data produced by time sources 22, 28, 36 correspond to the same selected time intervals (T) for Equation 1, i.e., one minute, 30 seconds, or in continuous real time. Time sources 22, 28, 36 may each be any conventional type of timekeeping device including, without limitation, clocks calibrated to an atomic time standard such as the National Institute of Standards and Technology (NIST), Global Positioning Satellite (GPS) signals, Automated Computer Time Service (ACTS), and Internet Time Service (ITS). Time data provided to data storage locations 20, 26, 34 may be any type of wired or wireless signal compatible with the data storage locations such as, without limitation, electrical or optical analog or digital signals, including serial and parallel data bus signals. In some embodiments two or more of time sources 22, 28, 36 may be combined to a single device configured to provide time data for at least two of data storage locations 20, 26, 34. A time source having a high degree of measurement accuracy and resolution is preferred, as the accuracy of the computed water distribution system demand generally corresponds to the accuracy of the time source correlated to the flow and water level measurements of flow meters 18, 24 and water level meter 30.

Data storage locations 20, 26, 34 and memory 40 may be any conventional type of data storage device such as, without limitation, a data logger, data acquisition system (DAS), flash memory, random access memory (RAM), magnetic bubble and/or disc media, optical disk media and magnetic tape. Data storage locations may be physically located anywhere in water distribution system 10 as separate or combined devices. One or more of data storage locations 20, 26, 34 may be co-located. Similarly, data storage locations 20, 26, 34 and memory 40 may also be integrated with any or all of flow meters 18, 24, time sources 22, 28, 36, water level meter 30 and control 38.

Control 38 may be any type of analog or digital control configured to receive the time and flow data and compute demand upon water distribution system 10. Example controls include, without limitation, computers, microcontrollers, central processing units (CPU), programmable controllers and logic devices, microprocessors, and ladder logic devices. Control 38 may include one or more sets of predetermined algorithms and/or instructions, such as a computer program, stored in any of memory portion 40 and data storage locations 20, 26, 34. Control 38 may also comprise an internet or other network-based unidirectional or bidirectional communication capability such that operation of the control may be remotely effected. Such communication capability may further provide for remote access to measurement data and demand computations according to the present invention and/or information relating to the status of water distribution system 10.

Figure 2:
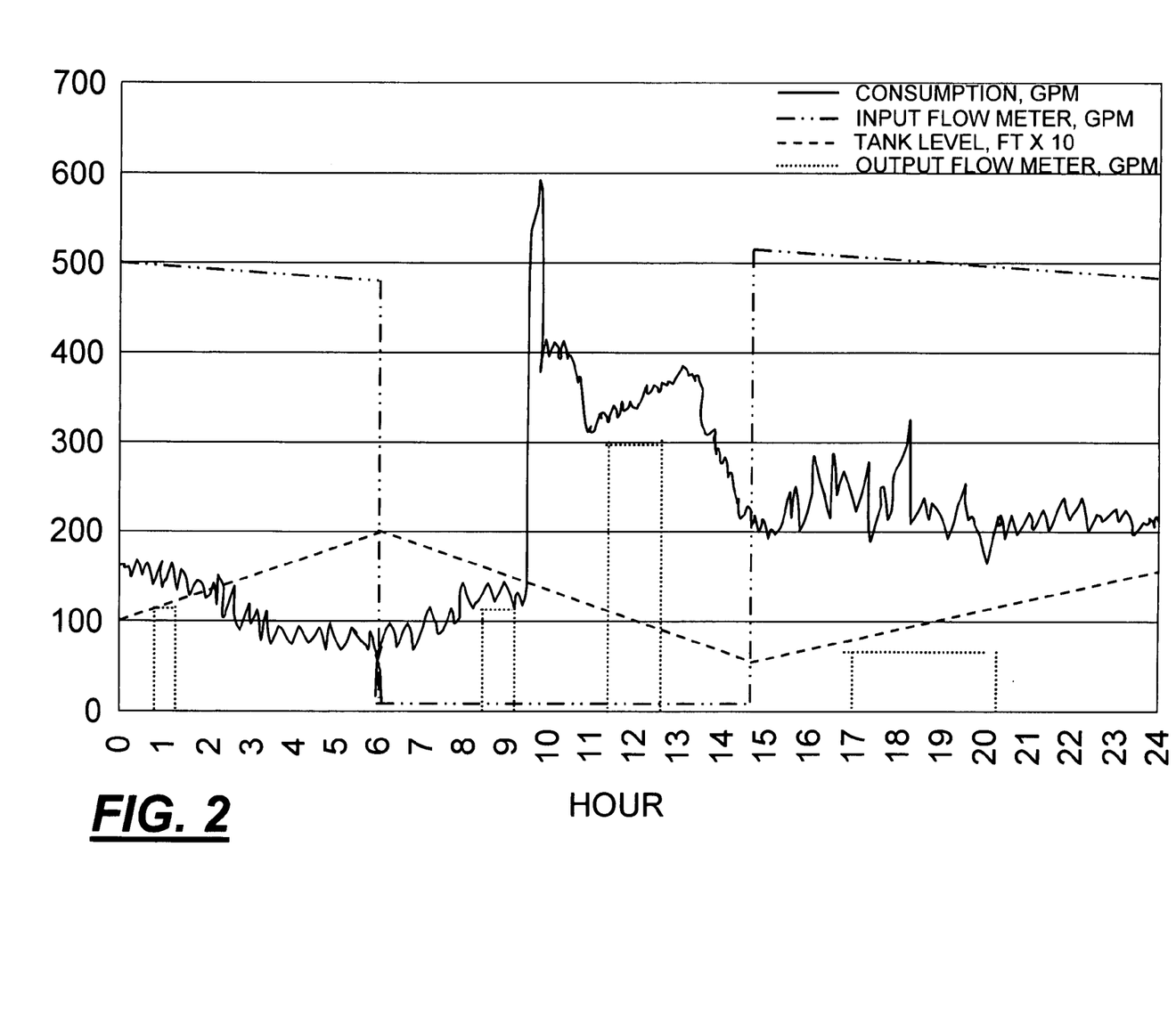
FIG. 2 is a representative graphical plot of water consumption, flow meter activity and storage tank level within a water distribution system have a storage tank over a twenty-four hour period, according to one embodiment of the present invention.

Data output 42 may be any type of conventional data output device including, without limitation, electronic solid state displays and cathode ray tubes (CRT) for display of visual images and printing devices for printed visual images. The visual images may represent one or more water demand computations, including graphs and plots of trends, minimum values and maximum values for various discrete periods of time, as shown in FIG. 2. In FIG. 2 a graph of demand upon water distribution is depicted, comprising a series of demand computations at times (T) using Equation 1 over a twenty-four hour period.

Also shown in FIG. 2 is a graph of the level of a storage reservoir 16, correlated in time to the computed demand. As discussed above, this measurement is converted to an equivalent flow as a component of the water demand calculation. This data is also separately useful to better understand the amount of water supplied by the storage reservoir during various levels of demand. Finally, FIG. 2 depicts times and amounts of water flow through input 12 and an example metered flow through output 25 to a single subscribing consumer.

Data output 42 may likewise serve as an alarm input to a control system (not shown) that alerts operators and/or controls elements of water distribution system 10 in response to measurements that exceed predetermined threshold values. A non-limiting example is the use of data output 42 to function as an alarm input that is activated when the demand upon water distribution system 10 exceeds a predetermined amount for a predetermined amount of time, indicating a leak or other malfunction in the water distribution system.

In yet another embodiment of the present invention data output 42 may also be published on one or more internet web sites, allowing relevant personnel to obtain and/or monitor demand data for water distribution system 10 from fixed or mobile locations accessible from anywhere in the world.

In the embodiment of FIG. 1 flow meters 18, 24 may be linked to their corresponding data storage locations 20, 26 by any conventional wired or wireless means including, without limitation, analog wiring, parallel and serial data buses, wired networks, wireless networks, RF signals, landline telephones, cellular telephone networks, Ethernet links, and the internet. Water level meter 30 may be likewise linked to data storage location 34. In addition, time sources 22, 28, 36 may be linked to their corresponding data storage locations 20, 26, 34 in a likewise manner. Finally, data storage locations 20, 26, 34 may be linked to control 38 in a similar manner.

Electrical power may be provided to the various measurement, time source and data storage components of water distribution system 10 in any conventional manner. Accordingly, electrical mains power may be provided to each component requiring electrical power. In some embodiments one or more components may be alternatively powered by batteries and/or solar energy sources as a supplement, backup or replacement for mains power.

EXAMPLES

With reference to FIG. 1, if water flow measured by input flow meter 18 is measured at 100 gallons for a predetermined period of time $T_1$, and the change in the volume of storage reservoir 16 is a decrease of 30 gallons during time period $T_1$ and the amount of water exiting water distribution system 10 via output 25 is zero, this data may be entered into Equation 1 as shown below:

$$D_T = 100 + (-30 + 0) = 70 \text{ gallons}$$

In this example $D_T$ represents a system loss of 70 gallons over time $T_1$, since no water is being supplied to output 25. Accordingly, water distribution system 10 has a water leak or other unaccounted-for usage, the magnitude of which can be quantified by the interval of $T_1$. For example, if $T_1$ is one hour, water distribution system is leaking water at a rate of 70 gallons per hour.

In a second example, if water flow measured by input flow meter 18 is measured at 100 gallons for a predetermined period of time $T_2$ and the change in the volume of storage reservoir 16 is an increase of 10 gallons during time period $T_2$ and the amount of water exiting via output 25 is 20 gallons, Equation 1 appears as shown below:

$$D_T=100+(10-20)=90 \text{ gallons}$$

Thus, the demand of water distribution system 10 during time period $T_2$ is 90 gallons.

Figure 3:
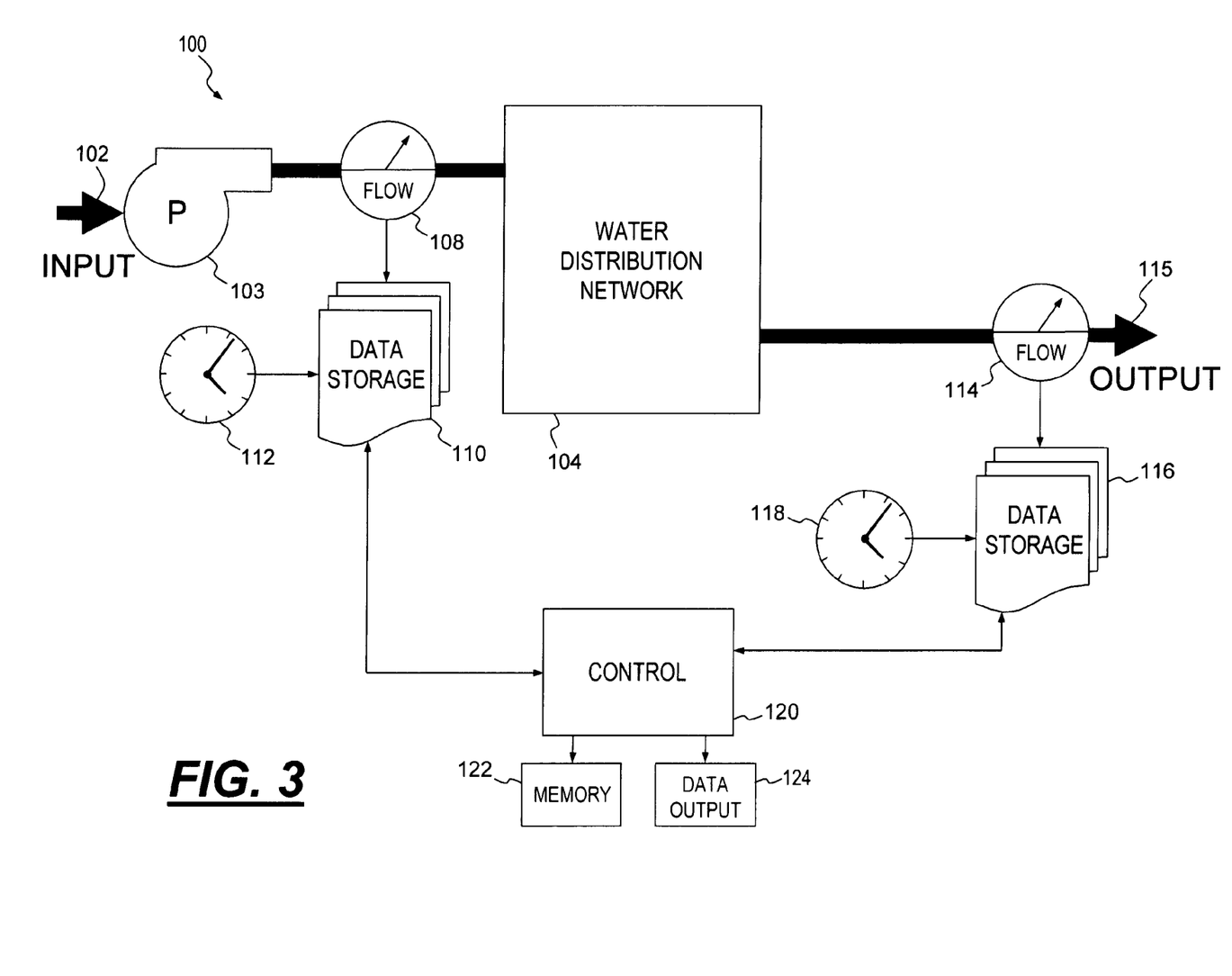
FIG. 3 is a schematic view of a method and system for assessing the amount of water demand in a water distribution system that does not have a storage reservoir, according to another embodiment of the present invention.

An alternate embodiment of the present invention is depicted in FIG. 3 for a water distribution system lacking a storage reservoir. In this embodiment a water distribution system 100 has an input 102 that may include a pump 103 as shown, or may be a gravity-fed input. Water distribution system 100 further includes a first flow meter 108 that periodically and/or continuously measures water flow to distribution system 100 from input 102 and then stores the input flow data in a first data storage location 110. Data storage location 110 additionally receives and stores a corresponding time stamp for each input flow measurement, provided by a first time source 112. A second flow meter 114 measures water flow exiting an output 115 from distribution system 100 and stores the output flow data in a second data storage location 116. Data storage location 116 additionally receives and stores a corresponding time stamp for each output flow measurement, provided by a second time source 118 that is synchronized with first time source 108.

A control 120 is configured to receive measurement data and time stamps corresponding to the data from data storage locations 110 and 116. Once flow data and corresponding time stamps are available for input 102 and output 115, control 120 is able to compute the demand upon water distribution system 100 for any period of time wherein data for the selected period of time is stored in data storage locations 110, 116. Demand may be computed utilizing Equation 2, below:

$$D_T=V_T \pm \Delta S_T \quad \text{Equation 2}$$

where $D_T$ is the water demand during a time interval (T), $V_T$ is the volume of water provided to water distribution system 100 by input 102 during the same time interval (T) and $\Delta S_T$ is the volume of water exiting the water distribution system via output 115 during same time interval (T).

The structure, function and operation of the components of water distribution system 100 are substantially the same as the components discussed above for water distribution system 10. Accordingly, details of these components will not be repeated here.

EXAMPLES

With reference to FIG. 3, if water flow measured by input flow meter 108 is measured at 200 gallons for a predetermined period of time $T_3$ and the amount of water exiting via output 115 during time period $T_3$ is 50 gallons, Equation 2 appears as shown below:

$$D_T=200+(-50)=150 \text{ gallons}$$

In this example $D_T$ represents a system demand of 150 gallons for time period $T_3$.

In a second example, if water flow measured by input flow meter 108 is measured at 180 gallons for a predetermined period of time $T_4$ and the amount of water exiting via output 115 during period of time $T_4$ is 70 gallons, Equation 1 appears as shown below:

$$D_T=180+(-70)=110 \text{ gallons}$$

Thus, The demand of water distribution system 100 during time period $T_4$ is 110 gallons.

In some embodiments of the present invention the data storage locations of FIGS. 1 and 3 may merely be data buffers, or may be absent from the water distribution system altogether. In such embodiments data from the flow and water level meters is supplied directly to the control, which can perform real-time demand calculations and/or store the data in memory 40, 122.

The input, storage reservoir and output of a water distribution system are discussed in singular form above in order to more clearly explain the present invention. In practice, the distribution network 10 of FIG. 1 may comprise a plurality of any of inputs 12, storage reservoirs 16 and outputs 25. Accordingly, $V_T$ of Equation 1 may represent the total volume of water supplied to distribution system 10 by the inputs 12, and $\Delta S_T$ is the total change in the stored volume of the storage reservoirs 16 and/or the total volume of water exiting the water distribution system via the outputs 25. Likewise, the distribution system 100 of FIG. 3 may comprise a plurality of inputs 102 and/or outputs 115. In this case $V_T$ of Equation 2 may represent the total volume of water supplied to distribution system 100 by the inputs 102 and $\Delta S_T$ is the total volume of water exiting the water distribution system via the outputs 115.

In some embodiments of the present invention water distribution systems 10, 100 of FIGS. 1 and 3 respectively may each represent a portion of a larger water distribution system. In such larger water distribution systems it may be desirable to monitor certain inputs, storage reservoirs and outputs defining the portion in order to isolate or reduce the extent of the distribution network being monitored. For example, in some embodiments the portion being monitored may be water supplied to a large-volume water consumer, such as a factory. In other embodiments water distribution systems 10, 100 may represent one water distribution system in a series of water distribution systems, such as a water system of a municipality that is supplied by another municipality and/or supplies yet another municipality.

One aspect of the present invention is the ability to provide water distribution system demand data over very small increments of time. This data can then be used by operators to schedule water storage, derive distribution system capacity needs and forecast peak usage demands.

Another aspect of the present invention is the ability to provide means for water distribution operators to immediately determine when an increase in demand occurs and thus enable them to react in a timely manner to meet that increased demand.

Yet another aspect of the present invention is to provide a method for detecting unaccounted-for water losses, such as leaks. Leakage generally occurs at a constant rate. Accordingly, reviewing the change in demand in the normal low demand periods enables system operators to estimate or quantify the amount of leakage. Using this method further enables the operators to determine the effect that correcting known leaks has on the overall consumption of water within the system.

Still another aspect of the present invention is to provide a computer that can monitor and analyze data corresponding to storage tank utilization, enabling the computer to calculate the tank volume turnover rate. This is important, since water stored in an open tank loses more chlorine disinfectant the longer it resides in the tank. Therefore, the water in the tank is preferably periodically replaced via usage and filling to ensure adequate disinfection. An additional benefit is minimizing tank freezing in colder months.

In summary, the present invention provides information relating to the state of a water distribution system that was heretofore unavailable. Such information includes measurement of peak consumption/demand over discrete periods of time; abnormalities in patterns of usage, such as hydrant flushing/testing, construction usage (flushing new lines) and fire flow usage in the water distribution system; minimal flow analysis to study historical trends regarding water losses and projected water losses due to leakage in the system; quantifying abnormalities by totalizing the flow during the abnormal time period and subtracting from it the average consumption/loss during similar time period; and quantifying minimal flow analysis by monitoring relative change in minimum observed calculated flow rates. Sudden changes in measured minimum calculated flow rates over a period of time beyond that expected for consumer usage is indicative of a new water leak. Additional output Water meters can be monitored and subtracted from the incoming flow meter(s) to further reduce the area of the water distribution system under investigation or study.

The highly accurate data generated by the present invention can also be used to enhance current water distribution computer modeling methods by increasing the resolution and accuracy of the models. Where multiple tanks and/or incoming water meters are spread throughout the distribution system, it is possible to use the data to derive the general area of the leak. This can be achieved by viewing the relative changes in flow before and after a leak has started. The tank (or meter) that suddenly increases in flow is likely providing the majority of the flow to supply the leak. Reviewing the distribution system hydraulics or computer modeling where available, can enable repairmen to determine the general area of the leak within the water distribution system. This can be further defined by isolating the area to feed off of a tank (or meter) by using existing isolation valves. Monitoring the system and individual tanks/meters without depressurizing the entire system is possible due to the fact that flow into and out of the tanks can be measured.

While this invention has been shown and described with respect to a detailed embodiment thereof, it will be understood by those skilled in the art that changes in form and detail thereof may be made without departing from the scope of the claims of the invention.

What is claimed is:

1. A method for determining the amount of demand in a water distribution system having an input, a storage reservoir and an output, the method comprising the steps of:
    measuring the volume of water flowing into the water distribution system through the input during a predetermined interval of time;
    measuring the change in the volume of water stored in the storage reservoir during the same time interval;
    measuring the volume of water flow exiting the water distribution system through the output during the same time interval;
    calculating an adjusted input measurement by subtracting the measured flow of water exiting the water distribution system from the measured volume of water flow into the water distribution system;
    adding a measured increase in the volume of the water in the storage reservoir to the adjusted input measurement, or subtracting a measured decrease in the volume of water in the storage reservoir from the adjusted input measurement, to determine the amount of demand upon the water distribution system; and
    providing the determined demand to at least one of a memory, a data storage location, and a data output.

2. The method of claim 1, further comprising the step of minimizing the amount of water exiting the water distribution system for the time interval, wherein the resulting demand computation represents unaccounted-for losses in the water distribution system.

3. The method of claim 1, further comprising the step of issuing an alarm signal if the demand exceeds a predetermined value.

4. A method for determining the amount of demand in a water distribution system having an input and an output, the method comprising the steps of:
    measuring the volume of water flowing into the water distribution system through the input during a predetermined interval of time;
    measuring the volume of water flow exiting the water distribution system through the output during the same time interval;
    subtracting the measured flow of water exiting the water distribution system from the measured volume of water flow into the water distribution system to determine the amount of demand upon the water distribution system;
    minimizing the amount of water exiting the water distribution system for the time interval, wherein the resulting demand computation represents unaccounted-for losses in the water distribution system; and
    providing the computed demand to at least one of a memory, a data storage location, and a data output.

5. The method of claim 4, further comprising the step of issuing an alarm signal if the demand exceeds a predetermined value.

6. A system for determining the amount of demand in a water distribution system having an input, a storage reservoir and an output, comprising:
    a first flow meter to measure the flow of water through the input;
    a first time source to provide time data corresponding to measurements of the first flow meter;
    a first data storage location to record the measurements of the first flow meter and time data corresponding to measurements of the first flow meter;
    a second flow meter to measure the flow of water through the output;
    a second time source synchronized with the first time source and configured to provide time data corresponding to measurements of the second flow meter;
    a second data storage location to record the measurements of the second flow meter and time data corresponding to measurements of the second flow meter;
    a water level meter to measure the volume of water stored in the storage reservoir;
    a third time source synchronized with the first time source and configured to provide time data corresponding to the measurements of the water level meter;
    a third data storage location to record the measurements of the water level meter and time data corresponding to measurements of the water level meter; and
    a control configured to receive measurements and corresponding time data from the first, second and third data storage locations and calculate the demand upon the water distribution system;
    wherein the calculated demand is provided to at least one of a memory, a data storage location, and a data output.

7. The system of claim 6 wherein the first and second flow meter are each one of a differential pressure flow meter, velocity flow meter, positive displacement flow meter, mass flow meter and an open channel flow meter.

8. The system of claim 6 wherein the water level meter further comprises a transducer.

9. The system of claim 6 wherein at least two of the first, second and third time sources are combined into a single time source.

10. The system of claim 6 wherein the data storage locations are one of a data logger, data acquisition system, flash memory, random access memory, magnetic bubble and/or disc media, optical disk media and magnetic tape.

11. The system of claim 6 wherein the control comprises at least one of a computer, microcontroller, central processing unit, programmable controller, logic device, microprocessor, and ladder logic device.

12. The system of claim 6 wherein the data output is at least one of an electronic solid state display, cathode ray tube, and printing device.

13. The system of claim 6 wherein the control further comprises a predetermined set of instructions.

14. The system of claim 6 wherein at least one of the first flow meter, first time source, first data storage location, second flow meter, second time source, second data storage location, water level meter, third time source, third data storage location and control are linked by at least one of wired and wireless means.

15. A system for determining the amount of demand in a water distribution system having an input and an output, comprising:
   a first flow meter to measure the flow of water through the input;
   a first time source to provide time data corresponding to measurements of the first flow meter;
   a first data storage location to record the measurements of the first flow meter and time data corresponding to measurements of the first flow meter;
   a second flow meter to measure the flow of water through the output;
   a second time source synchronized with the first time source and configured to provide time data corresponding to measurements of the second flow meter;
   a second data storage location to record the measurements of the second flow meter and time data corresponding to measurements of the second flow meter; and
   a control configured to receive measurements and corresponding time data from the first and second data storage locations and calculate the demand upon the water distribution system;
   wherein the calculated demand is provided to at least one of a memory, a data storage location, and a data output.

16. The system of claim 15 wherein the first and second flow meter are each one of a differential pressure flow meter, velocity flow meter, positive displacement flow meter, mass flow meter and an open channel flow meter.

17. The system of claim 15 wherein the water level meter further comprises a transducer.

18. The system of claim 15 wherein at least two of the first, second and third time sources are combined into a single time source.

19. The system of claim 15 wherein the data storage locations are one of a data logger, data acquisition system, flash memory, random access memory, magnetic bubble and/or disc media, optical disk media and magnetic tape.

20. The system of claim 15 wherein the control comprises at least one of a computer, microcontroller, central processing unit, programmable controller, logic device, microprocessor, and ladder logic device.

21. The system of claim 15 wherein the data output is at least one of an electronic solid state display, cathode ray tube, and printing device.

22. The system of claim 15 wherein the control further comprises a predetermined set of instructions.

23. The system of claim 15 wherein at least one of the first flow meter, first time source, first data storage location, second flow meter, second time source, second data storage location, water level meter, third time source, third data storage location and control are linked by at least one of wired and wireless means.

* * * * *